US009267033B2

(12) United States Patent
Cygan et al.

(10) Patent No.: US 9,267,033 B2
(45) Date of Patent: *Feb. 23, 2016

(54) BLENDS OF BIODEGRADABLE POLYMERS AND ACRYLIC COPOLYMERS

(75) Inventors: Zuzanna Cygan, Wayne, PA (US); Benjamin R. Davis, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/680,699

(22) PCT Filed: Apr. 28, 2008

(86) PCT No.: PCT/US2008/061712
§ 371 (c)(1),
(2), (4) Date: Jun. 30, 2010

(87) PCT Pub. No.: WO2009/045564
PCT Pub. Date: Apr. 9, 2009

(65) Prior Publication Data
US 2010/0267867 A1 Oct. 21, 2010

Related U.S. Application Data

(60) Provisional application No. 60/976,542, filed on Oct. 1, 2007.

(51) Int. Cl.
| | |
|---|---|
| C08L 67/04 | (2006.01) |
| C08L 101/16 | (2006.01) |
| C08L 1/02 | (2006.01) |
| C08L 3/00 | (2006.01) |
| C08L 33/00 | (2006.01) |
| C08L 101/00 | (2006.01) |

(52) U.S. Cl.
CPC ............. *C08L 67/04* (2013.01); *C08L 101/16* (2013.01); *C08L 1/02* (2013.01); *C08L 3/00* (2013.01); *C08L 33/00* (2013.01); *C08L 101/00* (2013.01); *C08L 2201/06* (2013.01)

(58) Field of Classification Search
CPC .............................. C08L 67/04; C08L 2207/20
USPC ........................................................ 525/190
See application file for complete search history.

(56) References Cited

U.S. PATENT DOCUMENTS

| | | | | |
|---|---|---|---|---|
| 5,252,642 | A * | 10/1993 | Sinclair et al. | 524/108 |
| 5,423,665 | A * | 6/1995 | Hentschel et al. | 425/8 |
| 5,449,708 | A * | 9/1995 | Schiltz | 524/47 |
| 6,060,622 | A * | 5/2000 | Okuyama et al. | 562/589 |
| 7,015,261 | B1 * | 3/2006 | Zerafati et al. | 523/201 |
| 7,132,490 | B2 * | 11/2006 | Obuchi et al. | 526/317.1 |
| 7,314,893 | B2 * | 1/2008 | Hong et al. | 523/201 |
| 7,396,880 | B2 * | 7/2008 | Goldbach et al. | 525/199 |
| 7,572,862 | B2 | 8/2009 | Lavach et al. | |
| 7,666,946 | B2 * | 2/2010 | Brake et al. | 525/190 |
| 7,799,412 | B2 * | 9/2010 | Yamamura et al. | 428/212 |
| 7,834,092 | B2 * | 11/2010 | Uradnisheck et al. | 525/190 |
| 7,868,101 | B2 * | 1/2011 | Lewis et al. | 525/415 |
| 2005/0136259 | A1 | 6/2005 | Mohanty et al. | |
| 2006/0025560 | A1 * | 2/2006 | Inoue et al. | 528/272 |
| 2006/0214331 | A1 * | 9/2006 | Jacobs | 264/328.1 |
| 2007/0179218 | A1 | 8/2007 | Brake et al. | |
| 2007/0292691 | A1 * | 12/2007 | Chang et al. | 428/411.1 |
| 2008/0027178 | A1 * | 1/2008 | Uradnisheck | 525/190 |
| 2008/0138601 | A1 * | 6/2008 | Watanabe et al. | 428/304.4 |
| 2009/0030132 | A1 * | 1/2009 | Kumazawa et al. | 524/493 |
| 2009/0110859 | A1 * | 4/2009 | Larson et al. | 428/36.9 |
| 2009/0149873 | A1 * | 6/2009 | Zhou et al. | 606/151 |
| 2009/0169844 | A1 * | 7/2009 | Yamamura et al. | 428/213 |
| 2009/0209704 | A1 * | 8/2009 | Uradnisheck | 525/190 |
| 2009/0270530 | A1 * | 10/2009 | Nakai et al. | 523/124 |
| 2010/0028657 | A1 * | 2/2010 | Ito et al. | 428/327 |
| 2010/0112357 | A1 * | 5/2010 | Fine et al. | 428/413 |
| 2010/0240833 | A1 * | 9/2010 | Sakurai | 525/190 |
| 2010/0317801 | A1 * | 12/2010 | Hirasawa | 525/190 |
| 2011/0082224 | A1 * | 4/2011 | Cygan | 521/134 |
| 2011/0244257 | A1 * | 10/2011 | Paulino et al. | 428/461 |

FOREIGN PATENT DOCUMENTS

| | | |
|---|---|---|
| JP | 2007/090877 A | 4/2007 |
| JP | 2007-119729 | 5/2007 |
| WO | WO 2004104077 A1 * 12/2004 | ............ C08J 9/00 |
| WO | WO 2007/089451 A2 | 8/2007 |
| WO | WO 2008/063988 | 5/2008 |

OTHER PUBLICATIONS

Henton et al. Polylactic Acid Technology, Natural Fibers, Biopolymers and Biocomposites, Chapter 16, 2006.*
Auras et al., Packag. Technol. Sci. 2005, 18, 207-216.*
Stoughton, Material Handling, Crystallizing and Drying PLA, Conair Group, 2006, Retrieved from the internet: URL: http://fwww.ptonline.com/articles/06confex07.html, p. 1, first paragraph.

* cited by examiner

*Primary Examiner* — Liam J Heincer
(74) *Attorney, Agent, or Firm* — Lynn B. Morreale

(57) ABSTRACT

The invention relates to a blend of one or more biodegradable polymers with one or more acrylic copolymers, for the purpose of improving the properties of the biodegradable polymer(s). The biodegradable polymer contains at least 10 weight percent of a biopolymer that is in less than ideal condition for processing. The "compromised" biopolymer may be undried biopolymer, may have a heat history (be "reprocessed", "regrind" or "recycled"), or both. The acrylic copolymer(s) are present in the blend at a level of 0.1 to 15 weight percent, based on the weight of the total blend.

11 Claims, 1 Drawing Sheet

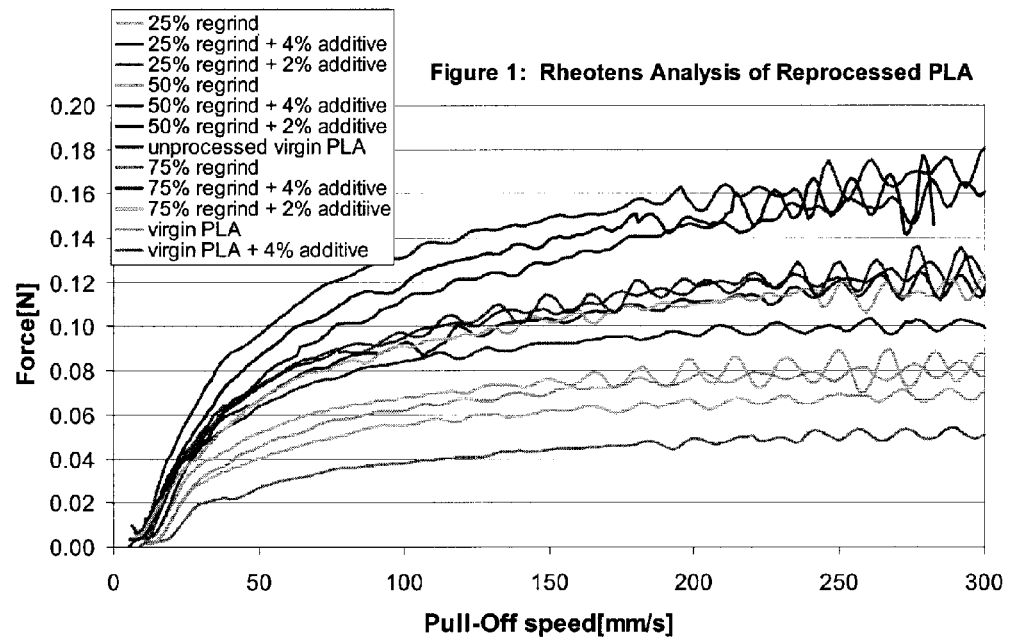
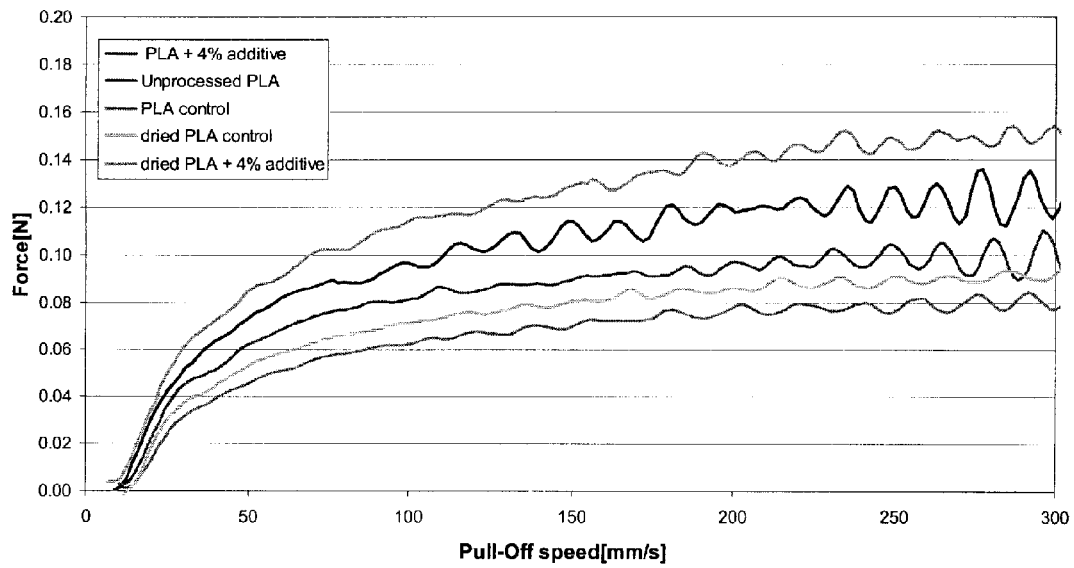

BLENDS OF BIODEGRADABLE POLYMERS AND ACRYLIC COPOLYMERS

FILED OF THE INVENTION

The invention relates to a blend of one or more biodegradable polymers with one or more acrylic copolymers, for the purpose of improving the properties of the biodegradable polymer(s). The biodegradable polymer contains at least 10 weight percent of a biopolymer that is in less than ideal condition for processing. The "compromised" biopolymer may be undried biopolymer, may have a heat history (be "reprocessed", "regrind" or "recycled"), or both. The acrylic copolymer(s) are present in the blend at a level of 0.1 to 15 weight percent, based on the weight of the total blend.

BACKGROUND OF THE INVENTION

Biodegradable polymers are finding use as environmentally-friendly alternatives for many common plastics in typical applications, such as in packaging materials and bottling.

One problem with many biodegradable polymers, for instance polylactide is the poor melt strength of the polymer. The poor melt strength of polylactide leads to difficulties in subsequent melt processing, such as extrusion, themoforming, blow molding and foaming. Acrylic copolymers have been used as process aids in PVC and polystyrene blends, such as in U.S. patent application Ser. No. 11/053364, however it would not be obvious to use similar processing aids in a polylactide or biodegradable polymers to achieve an improved melt strength. In polycarbonate, for example, no significant improvements in melt strength were noted with the use of an acrylic copolymer processing aid.

The problems with melt strength are compounded for material that has a thermal history (has been previously melt processed—such as a regrind, or recycled material). Polymer chains possess a memory, and the properties often change following heat processing. Recycled or reprocessed materials generally have an even lower melt strength than virgin materials, which can be due to a lower molecular weight, changes in polymer molecule interactions, etc.. The poor melt strength of reprocessed polylactide leads to difficulties in subsequent melt processing, such as extrusion, themoforming, blow molding and foaming.

Several uses of recylced PLA are know in the art. For example, JP 2001253964 and JP 2001252968 describe the blending of recyled PLA with virgin resin for the purposes of producing foamed material, but neither mentions the use of acrylic addivies.

In a similar manner, PLA that has not been dried will lead to hydrolylsis and a reduction in molecular weight during procesing. This results in a decrease in the melt strength of the material. The drying of the material is an expensive, time-consuming process that currently is done to prevent the problems associated with water in the PLA during processing.

U.S. 60/860375 and US 2007-0179218 disclose that the addition of small levels of certain acrylic copolymers to a dried, virgin biodegradable polymer such as polylactide can greatly increase the melt strength of the polymer.

Surprisingly, it has now been found that improvements in melt strength, melt extensibilty, melt elasticity and improved draw-down ratio can be achieved in compromised PLA to an extent even greater than that found with virgin material. The ability of low levels of acrylic additives to not only improve properties of compromised PLA, but to provide properties similar to or even better than vigin material was unexpected.

SUMMARY OF THE INVENTION

The invention relates to a biodegradable polymer composition comprising:
  a) 30 to 99.9 weight percent of one or more biodegradable polymers; wherein said biodegradable polymer comprises from 10 to 100 weight percent of a reprocessed biodegradable polymer, or 10 to 100 weight percent of an undried biodegradable polymer, or both, or a mixture thereof;
  b) 0-69.9 weight percent of one or more biopolymer; and
  c) 0.1 to 15 weight percent of one or more acrylic copolymers.

The invention also relates to an article made of the biodegradable polymer composition.

BRIEF DESCRIPTION OF THE FIGURES

FIG. 1: FIG. 1 is a plot of melt strength for dried polymer compositions having differing levels of regrind and different level of acrylic additive.

FIG. 2: FIG. 2 is a plot of melt strength for dried and undried polymer compositions and different levels of acrylic additive.

DETAILED DESCRIPTION OF THE INVENTION

The invention relates to blends of one or more biodegradable polymers, with one or more acrylic copolymers to produce a biodegradable polymer composition having improved properties such as melt strength. The biodegradable polymer contains at least 10 weight percent of one or more biopolymer that is undried, reprocessed, or both.

As used herein, the term "compromised" biodegradable polymer is used to describe a biodegradable biopolymer that is in less than ideal condition for processing. The "compromised" biopolymer may be undried biopolymer, may be non-virgin material that has been heat processed and has a heat history (be "reprocessed", "regrind" or "recycled"), or both or a mixture of both. The compromised heat processed biodegradable polymer must have been previously heated to the molten state. The heating could occur due to processes including, but not limited to extrusion, injection molding, thermoforming, foaming or calandering, and blow molding.

The undried biodegradable polymer is polymer resin that has not been subjected to common drying procedures such as, but not limited to, heating, heating with circulating air or vacuum, in order to reduce them moisture content of the polymer resin prior to melt processing. Drying is done to lower the moisture content of the material. This extra step requires additional time, and is probably energy intensive. Thus the composition of the invention saves manufacturing time and expense, since undried biodegradable polymers can be used.

The biodegradable polymer composition of the invention contains from 30 to 99.9 weight percent, and preferably 50 to 99.5 weight percent of the biopolymer. The total biodegradable polymer contains from 10 to 100 weight percent of compromised biodegradable polymer, preferably 20 to 80 weight percent and more preferably 25 to 75 weight percent of the compromised biodegradable polymer. The biodegradable polymer of the invention can be a single biodegradable polymer, or a mixture of biodegradable polymers. Some examples of biodegradable polymers useful in the invention include, but are not limited to, polylactide, and polyhydroxy butyrate.

The preferred polylactide and polyhydroxy butyrate can be a normal or low molecular weight.

In addition to the biodegradable polymer(s), other biopolymers, such as, but not limited to starch, cellulose, and polysaccharides, may be blended with the biodegradable polymer. Additional biopolymers, such as but not limited to polycaprolactam, polyamide 11 and aliphatic or aromatic polyesters may also be present. These other bio-polymers may be present in the composition at from 0-69.9 weight percent, and more preferably 0-50 weight percent.

One or more acrylic copolymers are used as process aids for the biodegradable polymers. The acrylic copolymers are present in the biodegradable polymer composition at from 0.1 to 15 weight percent, preferably from 1 to 5 weight percent, and more preferably from 2 to 4 weight percent. By "copolymers" as used herein is meant polymers having two or more different monomer units—including terpolymers and polymers having 3 or more different monomers. The copolymers could be random, block, gradient or of other architectures. "Acrylic copolymers" as used herein, refers to copolymers having 60 percent or more of acrylic and/or methacrylic monomer units. "(meth) acrylate" is used herein to include both the acrylate, methacrylate or a mixture of both the acrylate and methacrylate. Useful acrylic monomers include, but are not limited to methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth) acrylate, tert-butyl (meth)acrylate, amyl (meth)acrylate, isoamyl (meth)acrylate, n-hexyl (meth)acrylate, cycloheyl (meth)acrylate, 2-ethylhexyl (meth)acrylate, pentadecyl (meth)acrylate, dodecyl (meth)acrylate, isobornyl (meth) acrylate, phenyl (meth)acrylate, benzyl (meth)acrylate, phnoxyethyl (meth)acrylate, 2-hydroxyethyl (meth)acrylate and 2-methoxyethyl (meth)acrylate. Preferred acrylic monomers include methyl acrylate, ethyl acrylate, butyl acrylate, and 2-ethyl-hexyl-acrylate, methyl methacrylate, ethyl methacrylate, and butyl methacrylate.

In addition to the acrylic monomer units, the acrylic copolymer of the invention can also include up to 40 percent of other ethylenically unsaturated monomers polymerizable with the acrylic monomers, including, but not limited to styrene, alpha-methyl styrene, butadiene, vinyl acetate, vinylidene fluorides, vinylidene chlorides, acrylonitrile, vinyl sulfone, vinyl sulfides, and vinyl suloxides. In one embodiment, the copolymer contains styrene.

The copolymer of the invention generally has a weight average molecular weight in the range of 10,000 to 3,000,000 g/mol.

In another embodiment, the acrylic copolymer comprises 10-75 weight percent of methyl methacrylate units, 10 to 50 weight percent of butyl acrylate units, 0 to 50 weight percent of butyl methacrylate units, and from 0 to 80 weight percent of styrene, the total adding to 100 percent.

The copolymer of the invention can be made by conventional polymerization techniques, including, but not limited to mass, bulk, solution, suspension, emulsion and inverse emulsion polymerization.

The biodegradrable polymer composition of the invention contains 30-99.9 weight percent of the biodegradable polymer—of which 10-100 weight percent has been compromised, 0-69.9 weight percent of other biopolymers and from 0.1-15 weight percent of the acrylic copolymer(s).

In addition to the biodegradable polymer(s), biopolymer and acrylic copolymer(s)—adding up to 100 percent, the composition of the invention may additionally contain a variety of additives, including but not limited to, heat stabilizers, internal and external lubricants, impact modifiers, process aids, fillers, and pigments. Impact modifiers, either core/shell or block copolymers having at least one low Tg and one high Tg block or layer, are especially useful in the polylactide composition. In one embodiment, the impact modifier is an ethylene-propylene based copolymer with acrylates or a core-shell polymer having a rubbery core, Such as 1,3-dienes (also copolymers with vinyl aromatics) or alkyl acrylates with alkyl group containing 4 or more carbons and the shell is grafted onto the core and is comprised of monomers such as vinyl aromatics (e.g., styrene), alkyl methacrylates (alkyl group having 1-4 carbons), alkyl acrylates (alkyl group having 1-4 carbons), and acrylonitrile.

The ingredients may be admixed into a homogeneous blend prior to processing, or may be combined during one or more processing steps, such as a melt-blending operation. One or more components can be pre-blended, with the other ingredients added in process. This can be done, for instance by single-screw extrusion, twin-screw extrusion, Buss kneader, two-roll mill, impeller mixing. Any admixing operation resulting in a homogeneous distribution of acrylic copolymer in the biodegradable or biodegradable polymer blend polymer is acceptable. Formation of the blend is not limited to a single-step formation. Masterbatch formation of 15-99% acrylic copolymer in 1-85% carrier polymer followed by subsequent addition to the biodegradable polymer to derive a final blend is also anticipated. The carrier polymer may be, but is not limited to, polylactide, compromised polylactide, acrylic-methacrylic copolymers, and methacrylic homopolymers.

The biodegradable polymer composition may be directly extruded into a final article, sheet or profile, or the composition may be extruded into a strand that is pelletized. The formed pellets can then be stored and transported before being formed into a final article. Sheet formed from the composition can be molded into a final article.

In one embodiment, the biodegradable polymer does not require drying prior to processing, as is currently done with biodegradable polymers. Un-dried biodegradable polymer, either virgin polymer, 100 percent reprocessed polymer, or any between thereof, may be combined with the acrylic copolymer to achieve an improved melt strength that can even be equal to or greater than that of a dried, virgin polymer. The use of undried biodegradable polymer saves time and money over current practices requiring that the polymer be dried prior to processing.

In one embodiment it was found that 4 percent of the acrylic polymer added to an undried virgin or virgin/regrind PLA unexpectedly produced a melt strength even greater than when 4 percent of the same acrylic polymer was added to virgin PLA.

The addition of the acrylic copolymer additive to compromised biodegradable polymer not only produces an increased melt strength, but also improves the melt extensibility, melt elasticity and draw-down ratio.

The compositions of this invention may provide additional benefits, such improved melt strength for deep-draw thermoforming, blow molding, and foaming; improved draw-down in thermoforming; improved tensile and flexural strength; and improved impact resistance.

The composition of the invention can be processed using any known method, including but not limited to injection molding, extrusion, calendaring, blow molding, foaming and thermoforming. Useful articles that can be made using the biodegradable composition, include but are not limited to packaging materials, films and bottles. One in the art can imagine a variety of other useful articles and processes for forming those articles, based on the disclosure and examples herein.

EXAMPLES

By "virgin PLA" is meant the resin pellets (dried or not dried) that have not previously been through any heat histories, ie the resin as received from the manufacturer. "Unprocessed resin" is resin that has not been melt processed. Resin that has been "undried" is resin (either virgin or regrind) that has not been subjected to some drying process. "Dried" resin is resin (either virgin or regrind) that has been subjected to some drying process.

Example 1

A blend of 95-99% polylactide containing 0 (comparative), 2, and 4 percent by weight of acrylic-methacrylic copolymer (additive) was formed by melt extrusion using a twin-screw extruder. The polylactide used was a mixture of virgin PLA resin with 0% (comparative)-75% reprocessed material. The processing temperature and melt temperature during extrusion were maintained above the melting temperature of polylactide (>152° C.) to ensure a homogeneous melt. Melt strength was assessed by capillary rheometer tied to a rheotens melt strength measurement device. Blends were extruded through the capillary at a fixed speed and accelerated using the rheotens. The force required to accelerate the extrudate and the speed of the accelerating rheotens device (pull-off speed) were recorded until strand rupture. These data are summarized in FIG. 1.

As expected, the addition of high amounts of regrind material results in a decrease in the melt strength of the resulting blend, and the addition of acrylic-methacrylic copolymer increases them melt strength of all the blends. What is surprising about these data is the following:

1) the magnitude of the improvement in melt strength increased as the amount of reprocessed material in the blend increased. Thus with 4% of the acrylic-methacrylic copolymer additive at a pull off speed of 200 mm/s, the sample containing 25% reprocessed material had a 100% improvement in melt strength, the sample containing 50% reprocessed material had a 130% improvement in melt strength, and the sample containing 75% reprocessed material had a 230% improvement in melt strength.
2) The absolute value of the melt strength for samples with 4% acrylic-methacrylic copolymer additive is uniformly and substantially higher for all the samples containing reprocessed materials than it is for the sample containing only virgin polylactide. Thus with 4% of the acrylic-methacrylic copolymer additive at a pull off speed of 200 mm/s, the sample containing only virgin PLA had a melt strength of 0.12 N, whereas the melt strength of the samples containing reprocessed material was between 0.15-0.16 N.

Example 2

In a separate experiment, a blend of 95-99% polylactide containing 0 (comparative) and 4 percent by weight of acrylic-methacrylic copolymer (additive) was formed by melt extrusion using a twin-screw extruder. For all samples, the polylactide used contained only virgin PLA resin. Some of the samples used resin that had been exposed to ambient temperature and humidity for 24 hours prior to processing. Other samples were dried in a circulating air desiccant dryer at 70° C. for a minimum of 4 hours immediately prior to extrusion. The processing temperature and melt temperature during extrusion were maintained above the melting temperature of polylactide (>152° C.) to ensure a homogeneous melt. Melt strength was assessed by capillary rheometer tied to a rheotens melt strength measurement device. Blends were extruded through the capillary at a fixed speed and accelerated using the rheotens. The force required to accelerate the extrudate and the speed of the accelerating rheotens device (pull-off speed) were recorded until strand rupture. These data are summarized in FIG. 2.

Many polyesters, including polylactide, are known to partially hydrolyze when melt processed in the presence of moisture. These polyesters are typically dried prior to extrusion in order to minimize any hydrolysis or polymer degradation. In this experiment it is shown that compared to unprocessed PLA, some decrease in melt strength occurs when dried PLA is melt processed; however, it is less than the decrease in melt strength that occurs upon melt processing of PLA that has not been dried. What is unexpected is the observation that the addition of acrylic-methacrylic copolymer additive can be used to compensate for these decreases in melt strength, effectively enabling one to forgo the drying process.

What is claimed is:

1. A biodegradable polymer composition having improved properties, said composition consisting of a homogeneous blend of:
    a) 30 to 99.9 weight percent of one or more biodegradable polymers selected from the group consisting of polylactide and polyhydroxy butyrate or mixtures thereof; wherein said biodegradable polymer comprises from 25 to 75 weight percent of compromised, undried, non-virgin, recycled, regrind biodegradable polymer previously heated to a molten state with the remainder being virgin polylactide or polyhydroxy butyrate;
    b) 0 -69.9 weight percent of one or more biopolymer selected from the group consisting of starch, cellulose, polysaccharides, aliphatic or aromatic polyesters, and polycaprolactone;
    c) 2 to 4 weight percent of one or more acrylic copolymers based on the total weight of the blend,
    d) optionally a low level of up to 10 weight percent of impact modifier, based on the weight of the polylactide, and
    e) optionally one or more additives selected from the group consisting of heat stabilizers, internal and external lubricants, fillers, and pigments,
    wherein said improved property is that the melt strength is increased by at least 100% or more compared to that of a biodegradable composition consisting of virgin-biodegradable polymer.

2. The biodegradable composition of claim 1, wherein said impact modifier comprises at least two different types of impact modifiers.

3. The biodegradable of claim 1 wherein said acrylic copolymer has a weight average molecular weight of from 10,000-3,000,000 g/mol.

4. The biodegradable of claim 1 wherein the acrylic copolymer is a blend of two or more copolymers.

5. The biodegradable composition of claim 1, wherein said composition is clear.

6. A process for improving the properties of a biodegradable polymer blend composition,
    the method comprising the step of admixing to form a blend consisting of:

a) 30 to 99.9 weight percent of one or more biodegradable polymers selected from the group consisting of polylactide and polyhydroxy butyrate or mixtures thereof; wherein said biodegradable polymer comprises from 25 to 75 weight percent of undried, non-virgin, reground, recycled, biodegradable polymer previously heated to a molten state with the remainder being virgin polylactide or polyhydroxy butyrate;

b) 0 -69.9 weight percent of one or more biopolymer selected from the group consisting of starch, cellulose, polysaccharides, aliphatic or aromatic polyesters, and polycaprolactone;

c) 2 to 4 weight percent of one or more acrylic copolymers based on the total weight of the blend, d) optionally a low level of up to 10 weight percent of impact modifier, based on the weight of the polylactide, and e) optionally one or more additives selected from the group consisting of heat stabilizers, internal and external lubricants, fillers, and pigments to form a homogeneous blended composition having a melt strength that is increased by at least 100% or more compared to that of the virgin biodegradable polymer.

7. The biodegradable composition of claim 6, wherein said impact modifier comprises at least two different types of impact modifiers.

8. The biodegradable composition produced by the process of claim 6 wherein said acrylic copolymer has a weight average molecular weight of from 10,000-3,000,000 g/mol.

9. The biodegradable composition produced by the process of claim 6 wherein the acrylic copolymer is a blend of two or more copolymers.

10. The biodegradable composition produced by the process of claim 6, wherein said composition is clear.

11. The biodegradable composition produced by the process of claim 6, wherein one or more of said acrylic copolymers comprises 10-75 weight percent of methyl methacrylate units, 10 to 50 weight percent of butyl acrylate units, and from 0 to 80 weight percent of styrene, the total adding to 100 percent.

* * * * *